Feb. 18, 1969 K. W. JOHNSON 3,428,279
SHOCK AND VIBRATION MOUNT
Filed Aug. 30, 1966

INVENTOR.
KENNETH W. JOHNSON
BY
Dike, Thompson & Bronstein
ATTORNEYS

United States Patent Office 3,428,279
Patented Feb. 18, 1969

3,428,279
SHOCK AND VIBRATION MOUNT
Kenneth W. Johnson, Jamestown, Ohio, assignor to Barry Wright Corporation, Watertown, Mass., a corporation of Massachusetts
Continuation-in-part of application Ser. No. 436,834, Mar. 3, 1965. This application Aug. 30, 1966, Ser. No. 576,004
U.S. Cl. 248—21  8 Claims
Int. Cl. F16f 15/08, 15/00

ABSTRACT OF THE DISCLOSURE

A shock and vibration isolator in which a casing has a resilient supporting wall and receives a load bearing, sleeve-spring structure. The resilient supporting wall of the casing absorbs energy from shock and impact loading, and the sleeve-spring structure dampens both axial and transverse vibrations of a load.

Figure 1:
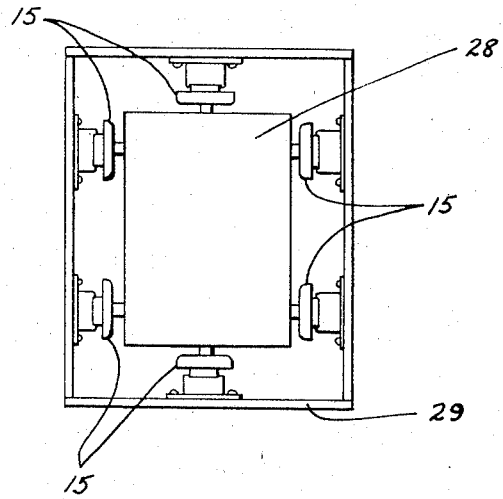

In an illustrative embodiment of the invention, the casing has a supporting wall of rubber-like material and a rigid end wall with an opening for receiving the sleeve-spring structure. A load-carrying cap is coupled to the sleeve-spring structure and is desirably supported beyond the end wall of the casing by a load carrying spring. The sleeve-spring structure includes an inner cylinder of resilient material that bears against the cap to provide transverse dampening. The sleeve-spring structure also includes an outer, split-sleeve cylinder that is radially pre-biased against the sides of the opening in the end wall of the casing to provide axial dampening.

---

This application is a continuation-in-part of copending application Ser. No. 436,834, filed Mar. 3, 1965, now Patent No. 3,323,764.

The present invention relates to protective means and, more particularly, to improved devices for isolating and protecting other devices from harmful and sometimes destructive effects of vibratory and/or shock forces to which such other devices may be subjected.

Unit type isolators are presently available which are generally effective to afford some degree of protection for other devices against vibratory forces or shock forces. However, the factors that influence the design of such devices are quite different in the case of units intended to protect against vibratory forces from those which govern if protection is desired from shock forces. Generally speaking, and as used herein, the term "shock" denotes suddenness, either in the application of a force or in the inception of a motion.

The primary function of a shock absorber or isolator is to provide a means whereby a device is protected against impact or instantaneous loads being transmitted from a base or frame of a second device or machine on which the first device may be mounted. Protection against shock forces or shock isolation is usually accomplished by storing energy within a resilient medium and then releasing such energy at a relatively slow rate. Generally, such devices comprise a spring which, together with the mass of the mechanism which it supports, has a natural frequency that is sufficiently different from that of the disturbing force as to bring about a minimum amplitude of vibration of the supported mechanism, and yet has sufficient static load-carrying capacity to support the load of such mechanism. Hence, a given shock absorber or isolator may be effective in a case where the mechanism is to be subjected to a relatively high magnitude of loading within a short time interval, for example, a 0.001 second or less, and yet may tend to magnify the shock where the mechanism is to be subjected to a loading of considerably smaller magnitude but with a longer time interval, for example, 0.001-0.015 second.

As used herein, the term "vibration" is used to describe a continuing periodic change in the magnitude of a displacement with respect to a specified central reference point. Also, as used herein, the term "mechanical vibration" is used to describe the continuing periodic motion of a solid body at any frequency. In most cases, mechanical vibration may be isolated by placing a resilient medium between the source of vibration and its surrounding area to reduce the magnitude of the force transmitted from a structure to its support or, alternatively, to reduce the magnitude of motion transmitted from a vibrating support to the structure. One of the prime considerations in the isolation of vibration is the proper use of isolating means under various load configurations with respect to the loading of such isolater means, the desired natural frequency, the position and location of the isolating means, and the relationship of the structural response of equipment to which such means are attached.

It can be shown that for vibration isolation means to be effective, the natural frequency thereof should be approximately 40% of the frequency of the disturbing source. Those skilled in the art will recognize that the natural frequency is the frequency at which a freely vibrating mass system will oscillate once it has been disturbed. There are many instances where equipment must operate over a fairly wide frequency range, for example, as in aircraft where vibrations may occur in the range from 5 to in excess of 2000 cycles per second. In many instances, the equipment will thus be subjected to lower frequencies initially; will pass through a condition known as resonance or resonant frequency; and may be designed for normal operation at a frequency which is considerably higher than the resonant frequency. As used herein, resonance exists when the natural frequency of a vibration isolator means coincides with the frequency of the disturbing vibratory forces; and resonant frequency means that frequency at which such coincidence occurs.

A condition of resonance causes magnification of the disturbing vibratory forces and may be harmful, and sometimes destructive, to equipment subjected to such forces unless proper controls can be effected. To provide such controls, the resilient medium of a vibration isolation means must be provided with suitable damping. While vibration damping is helpful under conditions of resonance, it may be detrimental in many instances to a system at frequencies above the resonant frequency.

Thus, it is apparent that the principal factors influencing the design of a shock or a vibration type of isolator will often lead to differing requirements depending upon what type of protection is desired. Accordingly, present unit type isolators are generally effective within their intended range of operation for either vibration or shock absorption, but will provide only limited ability or no ability to absorb both shock and vibration. This is especially true when the design conditions require a natural frequency of the isolation unit in the 4 to 10 cycle per second range for proper vibration absorption, and at the same time the resilient medium or cushion for absorbing the shock energy requires a relatively high spring rate or gradient, and at the same time it is required to provide effective damping in the vertical and horizontal directions during the vibration phase of the environment in which the isolator unit is to be installed.

Accordingly, it is an object of the present invention to provide means for obviating the above difficulties.

Another object is to provide a unit type of isolator that is effective in reducing vibration and shock forces within its designed frequency range.

A further object is in the provision of a unit type isolator that is self-contained and requires no other structural members for its operation.

Still another object is in the provision of a unit type isolator that is readily adaptable to a wide range of different frequency responses merely by changing or selecting the desired spring rate of the load carrying spring.

A further object is in the provision of a load-supporting member of resilient material for storing and releasing at a desired rate energy resulting from forces applied thereto from opposite and/or mutually perpendicular directions.

Still another object is in the provision of the unit type isolator capable of providing independent damping in the vertical and horizontal directions.

A further object of the invention is to provide a device of the character set forth which is mechanically simple in construction, inexpensive to manufacture, is effective and efficient in use, and yet is readily modified through selection and replacement of one or more of the components thereof in order to provide a device that is effective over a wide range of operating conditions for absorbing vibration and/or shock impulses.

Figure 2:
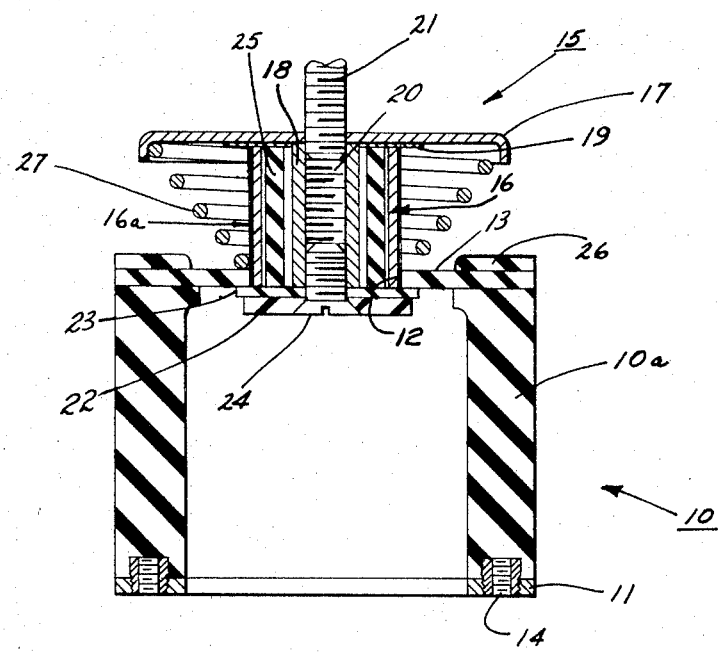

These and other objects of the invention will become apparent from the following description taken in conjunction with the drawings in which:

FIGURE 1 is a plan view of an object mounted on a supporting structure and illustrating the manner in which such an object is isolated by a unit embodying the present invention; and FIGURE 2 is a somewhat enlarged sectional view of the isolation device illustrated in FIGURE 1.

Referring to the drawings and particularly to FIGURE 2, there is shown therein an isolation unit comprising a hollow cup-shaped member 10 having a mounting base 11 and having an opening 12 provided in the central portion of the top horizontally extending portion 13 of member 10. A plurality of screw or bolt-receiving openings 14 are provided in base 11 to facilitate mounting of the isolator unit. The unit generally is designated at 15 (FIGURE 1).

A split cylindrical or sleeve spring 16 is slidably received within opening 12. For reasons which will become apparent as the description proceeds, the outside diameter of spring 16 and its surrounding cover 16a is somewhat greater than the diameter of opening 12. A cap 17 of relatively shallow cup-shape having a member 18 affixed thereto and projecting downwardly through the central portion of cylindrical spring 16. Member 18 is provided with a hollow central portion having thread means 20 for threadedly engaging a mounting bolt 21. Cylindrical spring 16 is pressed against cap member 17 through washer 19 by means of washers 22 and 23 which bear against the lower end portion of spring 16 and are secured by a screw 24 in threaded engagement with threads 20. A resilient member 25 is interposed between the internal surface of cylindrical spring 16 and the exterior surface of downwardly projecting member 18. Generally, the length of resilient member 25 will be somewhat greater than the length of the cylindrical spring 16 so that member 25 is preloaded. Those skilled in the art will appreciate that through proper choice of the length of member 25 and/or the insertion of washers between the ends of member 25 and/or washer 23 and/or cap 17, the magnitude of the preloading force of member 25 can be varied as desired.

Interposed between the top part of extending portion 13 of casing 10 and cap member 17 is a cushion member 26 that is annular in shape and is made of an elastomer, i.e. a rubber or rubberlike resilient material. The side wall of member 10 is also elastomeric, i.e. made of rubber or rubberlike material so that member 10 simultaneously functions as a casing member and also provides another cushion member 10a. Compression spring 27 is interposed between the top horizontally extending rigid portion 13 of casing member 10 and cap member 17. An object 28 that is to be isolated and protected against vibration and/or shock is mounted on a suitable base member 29 with an isolator unit 15 interposed therebetween as shown in FIGURE 1.

In operation, spring 27 serves as a load supporting and vibration isolating spring for object 28 and supports the load of said object without interference from resilient cushion members 10a, 26. If the object 28 is dropped or otherwise subjected to a shock or impact type of loading, spring 27 will be compressed sufficiently so that cap member 17 engages the upper resilient member 26 which together with resilient wall 10a, absorbs energy from such shock or impact loading and provides a cushion or cushioning effect. When such shock or impact loading is removed, the energy then stored in compressed spring 27 tends to suddenly return the unit and object 28 to is initial position in which case resilient wall member 10a similarly acts as a cushion to provide a cushioning effect against shock or impact loading in the opposite direction when washer 23 is returned into engagement with portion 13. After the shock has been dissipated, the lower frequency spring member 27 again functions as a vibration isolator.

As noted heretofore, the outer diameter of cylindrical spring 16 and cover 16a are somewhat greater than the diameter of opening 12. Hence, upon occurrence of relative vertical motion between spring 16 and casing 10, the spring cover 16a slidably disposed within central opening 12 creates a frictional force resisting such motion thereby providing damping for the load carrying spring 27. Similarly and as noted heretofore, resilient member 25 is preloaded, so that when relative horizontal motion occurs between cap 17 and casing member 10, it results in a rubbing action between the ends of resilient member 25 which bears, respectively, against washer 19 interposed adjacent upper cap member 17 and also against washer 23, thereby providing horizontal damping for loading carrying spring 27. When object 28 is subjected to shock or impact loading, resilient cushion 26 is engaged and deflection of wall 10a and cushion 26 occurs in the amount designed for such shock loading. Once the shock or impact loading has been dissipated, object 28 is again returned to its normal position wherein it is supported mainly by spring 27 without interference from resilient members 10a, 26.

From the foregoing description, it will be apparent that the device is capable of absorbing and isolating shock and/or vibration because of the provision of elements having different natural frequencies. Those elements having higher natural frequencies will absorb shock while those of relatively low natural frequencies will isolate vibration.

The construction of the device is readily adaptable to various modifications so that through the proper selection and/or elimination of the various elements thereof, a unit may be provided that is designed for a particular purpose only. For example, by omitting members 25 and 27, the principal absorbing elements are resilient members 10a, 26 having a high natural frequency so that the device may be utilized as a shock absorber unit. Similarly, if it is desired to provide for damping forces primarily, spring 27 is omitted.

While a particular embodiment of the invention has been illustrated and described, it will be obvious to those skilled in the art that various changes and modifications may be made without departing from the invention, and it is intended in the appended claims to cover all such changes and modifications that fall within the true spirit and scope of the invention.

I claim:
1. A shock and vibration isolator comprising
   a cup-shaped member having a resilient side wall and a rigid end wall with a circular opening therein,
   a split cylindrical sleeve spring slidably received within the circular opening in the end wall of said cup- shaped member, the outside diameter of said sleeve spring when withdrawn from said end wall being greater than the diameter of said opening, a cap member having a depending portion projecting into said cylindrical sleeve spring, a resilient member within said cylindrical sleeve spring and exterior to the depending portion therein of said cap member, said resilient member being of greater length than said cylindrical sleeve spring when withdrawn therefrom, means connected to the depending portion of said cap member for retaining said resilient member within said cylindrical spring.

and a load carrying spring interposed between the end wall of said cup-shaped member and said cap member.

2. A shock and vibration isolator in accordance with claim 1 wherein said resilient side wall is of elastomeric material.

3. A shock and vibration isolator in accordance with claim 1 wherein said resilient member within said cylindrical sleeve spring is prestressed and in frictional engagement with and between said rigid end wall and the retaining means.

4. A shock and vibration isolator in accordance with claim 3 wherein said load carrying spring comprises a compression spring.

5. A shock and vibration isolator in accordance with claim 4 wherein a resilient cushioning member is connected to said rigid end wall and is disposed between said end wall and said cap member.

6. A shock and vibration isolator in accordance with claim 5 wherein said cushioning member is of rubber-like material.

7. A shock and vibration isolator in accordance with claim 6 wherein said resilient side wall is of a rubber-like material.

8. A shock and vibration isolator in accordance with claim 5 wherein said cushioning member is spaced apart from said cap member.

References Cited

UNITED STATES PATENTS

| | | | |
|---|---|---|---|
| 2,386,463 | 10/1945 | Hile | 248—358 |
| 2,867,434 | 1/1959 | Johnson | 248—358 XR |
| 2,917,264 | 12/1959 | Hartenstein | 248—358 |
| 3,003,738 | 10/1961 | Horovitz | 248—358 |
| 3,323,764 | 6/1967 | Johnson | 248—21 |

JOHN PETO, *Primary Examiner.*

U.S. Cl. X.R.

248—358